(12) United States Patent
Owens (10) Patent No.: US 11,311,992 B2
(45) Date of Patent: Apr. 26, 2022

(54) REDUCED DRIP FILTER REMOVAL TOOL

(71) Applicant: Last Drop Wrench, LLC, Gaffney, SC (US)

(72) Inventor: Christopher Steven Owens, Gaffney, SC (US)

(73) Assignee: Last Drop Wrench, LLC, Gaffney, SC (US)

( * ) Notice: Subject to any disclaimer, the term of this patent is extended or adjusted under 35 U.S.C. 154(b) by 495 days.

(21) Appl. No.: 16/449,254

(22) Filed: Jun. 21, 2019

(65) Prior Publication Data

US 2019/0389041 A1    Dec. 26, 2019

Related U.S. Application Data

(60) Provisional application No. 62/689,209, filed on Jun. 24, 2018.

(51) Int. Cl.
*B25B 27/00* (2006.01)
*B01D 29/96* (2006.01)
*B25B 13/06* (2006.01)

(52) U.S. Cl.
CPC .......... *B25B 27/0042* (2013.01); *B01D 29/96* (2013.01); *B25B 13/06* (2013.01); *B01D 2201/24* (2013.01)

(58) Field of Classification Search
CPC ..... B25B 27/0042; B25B 13/06; B25B 13/48; B01D 29/96; B01D 2201/24
See application file for complete search history.

(56) References Cited

U.S. PATENT DOCUMENTS

| | | | | |
|---|---|---|---|---|
| 4,177,529 A | * | 12/1979 | Sikula, Jr. | B01D 27/00 141/330 |
| 4,266,452 A | | 5/1981 | Crist | |
| 5,271,299 A | * | 12/1993 | Wadsworth | F16N 33/00 7/100 |
| 5,299,714 A | * | 4/1994 | Kilgore | B67B 7/26 222/192 |
| 5,390,823 A | | 2/1995 | Kilgore | |
| 5,421,223 A | * | 6/1995 | Wawrzyniak | B25B 27/0042 210/238 |
| 5,694,990 A | * | 12/1997 | Crima | B01D 35/16 141/330 |
| 6,056,874 A | * | 5/2000 | Goodman | F16N 31/002 137/312 |
| 8,651,134 B1 | * | 2/2014 | Kurtz | F16N 31/00 137/318 |

* cited by examiner

*Primary Examiner* — David B. Thomas
(74) *Attorney, Agent, or Firm* — Kim and Lahey Law Firm, LLC; Douglas W. Kim (57) ABSTRACT

This invention is directed to a filter removal tool comprising: a cup configured to engage with a filter so that rotating the cup rotates the filter; a shaft having a bore and extending through the cup at a proximal end of the cup; a puncture cap removably attached to the shaft and configured to be received in the cup and to puncture the filter when the shaft transitions from a first position to a second position; a lateral puncture cap opening defined in the puncture cap in fluid communication with the bore; and, a removal tool portion carried by the cup configured to receive a tool for rotating the cup.

20 Claims, 9 Drawing Sheets

REDUCED DRIP FILTER REMOVAL TOOL

BACKGROUND

1) Field of the Invention

This invention is directed to a tool for removing a filter and the contents of the filter while reducing or preventing the contents of the filter from dripping or leaking in an uncontrolled manner.

2) Description of the Related Art

Mechanical devices with moving parts such as engines include fluids as a component of their operation. For example, oil can serve as a lubricant for moving mechanical parts to reduce friction and prolong operational life of these parts. This fluid is typically filtered to prevent debris from building up in the engine and extending operational life. As these fluids age, including oil, their effectiveness is reduced and is typically changed. The filter associated with the fluid system is also changed contemporaneously with the fluid change.

It is recommended that these filters be replaced periodically. For safety reasons, the filter and contents are allowed to cool prior to the removal of the filter, changing oil and replacement of the filter. For example, in a passenger automobile, standard operating temperatures for oil exceeds 220° F., well above the temperature to burn human skin, which can be as low as 110° F. Therefore, it is prudent to wait until the oil is sufficiently cooled prior to changing the filter and oil. Based upon the ambient temperature, this can be 30 mins or more. For commercial services that provide fast oil changes, they must risk injury with hot oil to meet customer demands for timely oil changes.

Further, oil is difficult to clean when spilled due to its very nature, it provides a coating on the surface of which it contacts. This coating, resulting from a spill, can cause disadvantages such as fluid spills on vehicles, workers and the working environment. Additionally, oil spills can pose a safety hazard by creating an undesirable slick surface on the vehicle or in the working environment. Further, undesirable oil in an engine compartment can make it difficult to isolate and repair leaks, can accelerate the wear of rubber hoses and plastic parts and can reduce the aesthetics resulting in a lower vehicle valuation. Further, there is some evidence that when oil is removed from the engine compartment, the engine runs cooler as the dirt buildup that can occur due to unnecessary oil can reduce the heat exchange between the engine and the surrounding environment. In some cases, oil buildup creates hot spots in the engine shortening the engine life. Further, oil in the engine compartment can migrate into other areas such as air filters.

Filters come is several varieties. One such filter is a canister filter that can be seen in U.S. Pat. No. 4,266,452. This canister type filter includes a polygonal in cross section at a lower end that includes a plurality of flat sides for engaging a tool that can be used to receive the canister type filter, engaged with the flat sides and assist with turning (e.g. unscrewing) the canister filter from the fluid system. The problem created is that when the canister type filter is removed from the fluid system fluid can leak from around the top of the canister type filter and unwantedly spill on the ground, on the user, or other undesirable areas. This is especially a disadvantage with canister type filters with a threaded portion that engages with a corresponding threaded portion of the fluid system. In operation, these filters are full of fluid that is being filtered so that when they are removed, the fluid tends to escape from the filter into undesirable areas. Most engine designs place fluid, such as oil, in the filter even when the engine is off so that removal of filter inevitably requires managing the fluid in the filter.

As stated in U.S. Pat. No. 5,390,823, removal of such a canister type filter can be a messy task which has been exacerbated by manufacturer's placing these filters in areas that are difficult to access. Therefore, the problem of spilling fluid is magnified by the current designs of mechanical systems such as automobiles. An attempt to remove the fluid from the filter is shown in this reference. However, there is no ability to remove the filter itself and the punch must be removed from the filter prior to a filter wrench being applied to the filter.

Therefore, it is an object of the present invention to provide for an integrated fluid drainage tool and removal tool for filters.

It is another object of the present invention to provide for a fluid drainage tool that prevent or eliminates contact with hot fluid.

BRIEF SUMMARY

The above objectives are accomplished by providing a filter removal tool comprising: a cup configured to engage with a filter so that rotating the cup rotates the filter; a shaft having a bore and extending through the cup at a proximal end of the cup; a puncture cap removably attached to the shaft and configured to be received in the cup and to puncture the filter when the shaft transitions from a first position to a second position; a lateral puncture cap opening defined in the puncture cap in fluid communication with the bore; and, a removal tool portion carried by the cup configured to receive a rotational tool for rotating the cup. The rotational tool can be any tool configured to rotation the cup.

The tool can include an impact member attached to a proximal end of the shaft having an impact member opening defined in the impact member in fluid communications with the puncture cap. The tool can include a lower portion included in the cup for receiving the puncture cap when the shaft is in the first position. The tool can include a seal disposed between a base of the puncture cap and the interior wall of the lower portion of the cup. The tool can include a puncture cap seal disposed above a base of the puncture cap and configured to engage with the filter when the shaft is in the second position. Magnets can be disposed in the cup for removably securing the wrench to the filter. A stop can be included in the puncture cap to arrest the puncture cap from fully penetrating the filter.

The tool can include a cup configured to engage with a filter so that rotating the cup rotates the filter; a puncture cap carried by a shaft can be configured to be received in the cup and to puncture the filter when the shaft transitions from a first position to a second position; and, a lateral puncture cap opening defined in the puncture cap configured to allow fluid to flow from the cup to a proximal end of the cup. The tool can include a tool removal portion defined in a lower portion of the cup configured to receive a tool, such as a socket, open wrench, boxed wrench or the like for rotating the cup. The shaft can be removably connected to the puncture cap. A second cap opening can be configured to receive the puncture cap in a first position. A puncture cap base can be included in the puncture cap and configured to engage with an inner wall of the second cap opening.

The tool can include a cup configured to receive a portion of a filter; a puncture cap carried by the cup and configured to puncture the filter to allow fluid to flow from the filter, through the puncture cap and out the cup; and, an opening defined in the puncture cap configured to allow fluid to flow from the filter out the cup. The tool can include a shaft carried by the puncture cap having a bore in fluid communications with an interior of the cup. The tool or cup can be configured to prevent fluid from flowing from the filter when the puncture cap is in the second position.

The puncture cap and shaft can be configured to slide within the cup between a first and second position so that when a force is applied to the impact member, a puncture end of the puncture cap punctures the filter allowing fluid to escape from the filter, through the puncture cap, the shaft, and out the cup or shaft. The tool can include a plurality of openings disposed laterally around the puncture cap in fluid communication with the bore in the shaft. The invention can be configured to be assembled with a variety of different sized cups so that different sized filters can be removed. The diameter of the impact member can be less than the diameter of an engagement portion of a rotational tool. The impact member can be configured to be received on a tool that can be used to rotate the cup.

BRIEF DESCRIPTION OF THE SEVERAL VIEWS OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DETAILED DESCRIPTION

Figure 1A:
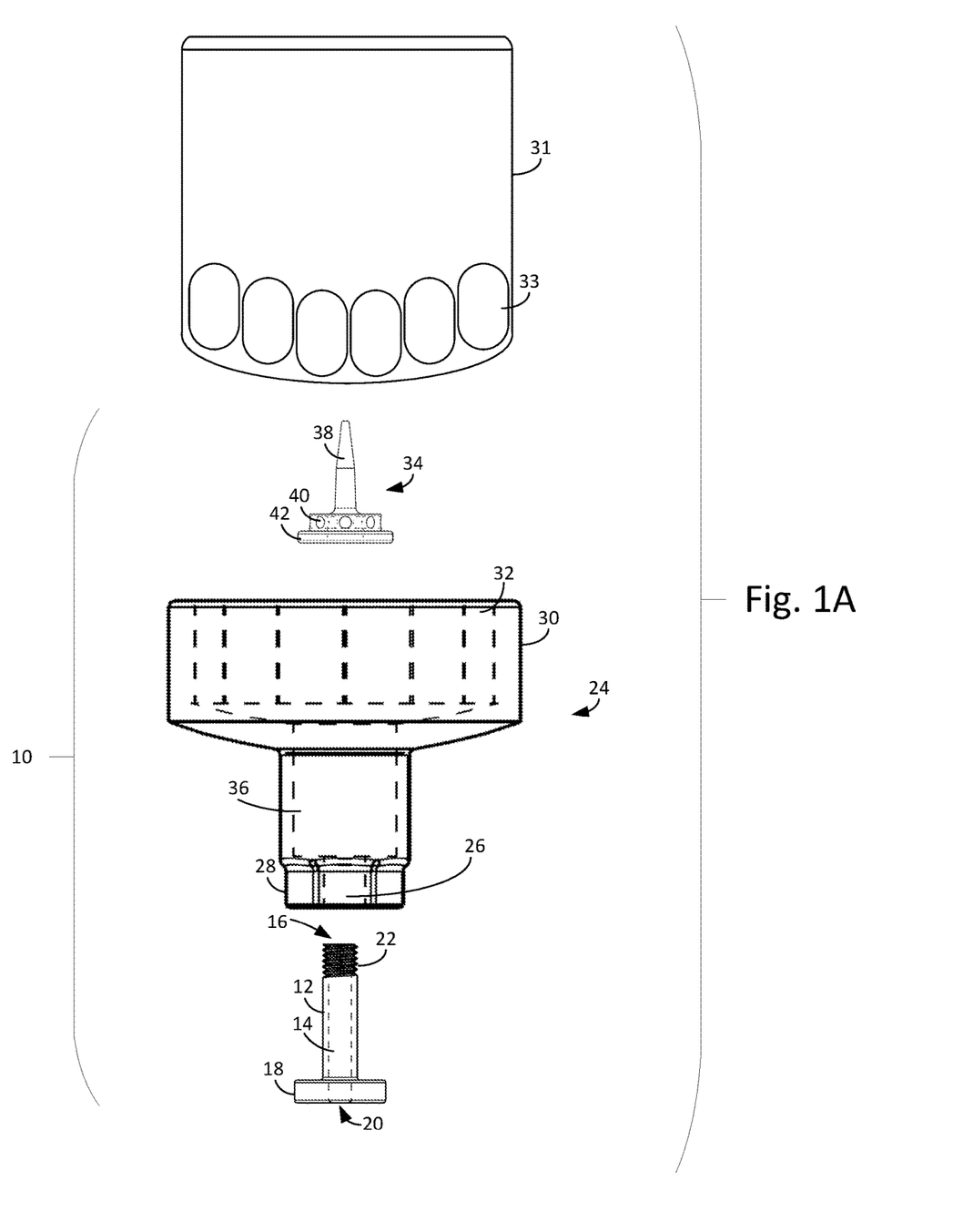
FIGS. 1A and 1C are schematics of various aspects of the tool.

With reference to the drawings, the invention will now be described in more detail. Referring to FIG. 1A, the removal tool 10 is shown having a shaft 12 that has a bore 14 running lengthwise along the shaft with a shaft top opening 16. An impact member 18 can be attached to the proximal end of the shaft and include an impact member opening 20. In one embodiment, the shaft can include a threaded portion 22 at a distal end of the shaft.

The shaft can be received into a wrench 24 through a first cup opening 26. The wrench can include a tool removal portion 28 allowing a rotational tool to engage the wrench allowing the wrench to be turned with a rotational tool such as a socket, open wrench, closed wrench or other tool configured to rotation the cup. The wrench can include a cup 30 for engaging with a filter 31 that can include one or more flat portions 32 on an interior wall of the cup and can circumvent the interior of the cup. These flat portions can engage filter flat portions 33 allowing the filter to rotate when the cup is rotated. Magnets can be disposed along the interior wall of the cup or on the floor of the cup to temporarily secure the cup to a filter.

A puncture cap 34 can be received in a second cup opening 36 and can be removably attached to the shaft. The puncture cap can include a puncture end 38 that can puncture a filter. Lateral puncture cap openings 40 can be disposed under the puncture end so that fluid can flow through the puncture cap opening, into the core of the shaft, and out the impact member opening. A puncture cap base 42 can be included in the puncture cap and received into a portion of the cup.

Figure 1B:
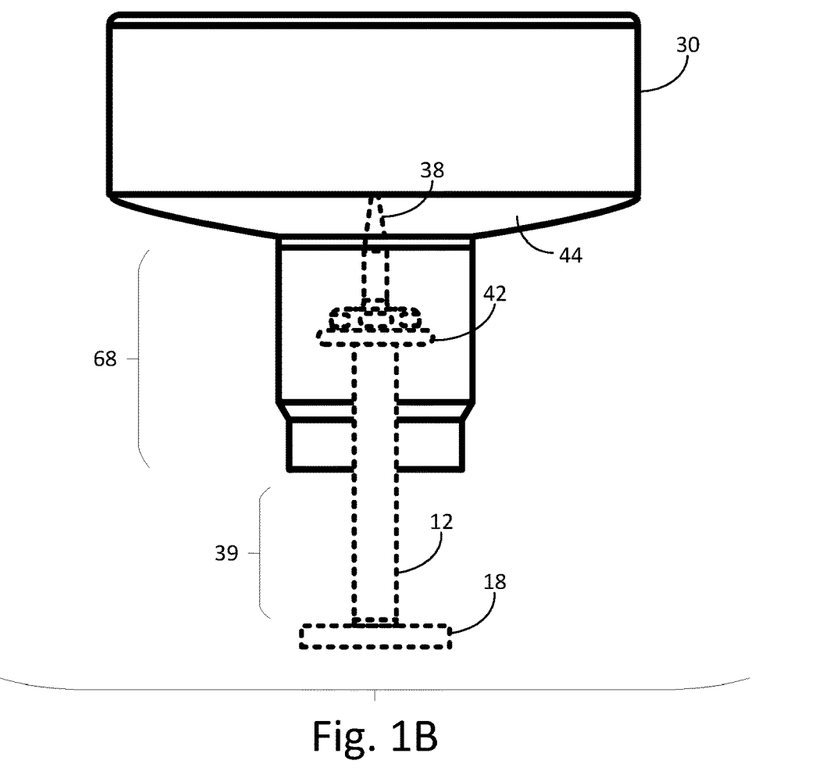
Figure 1C:
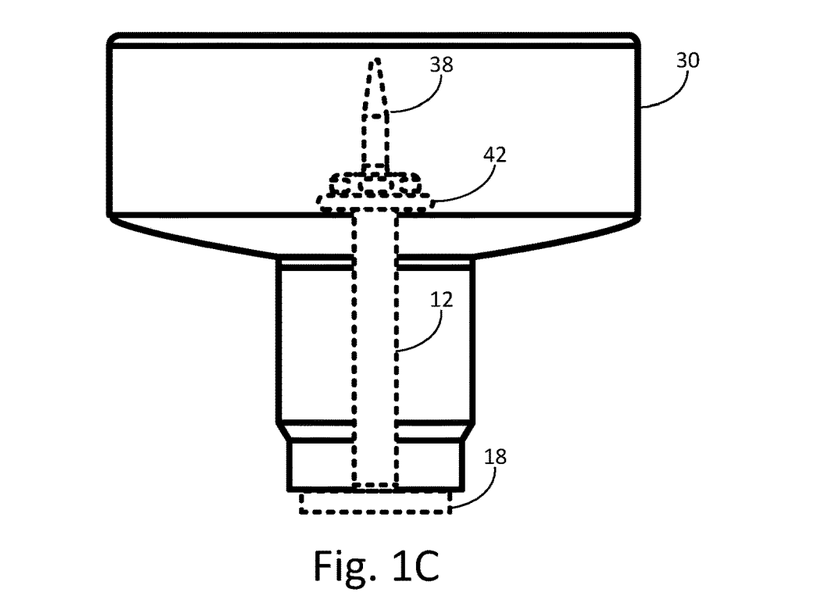

Referring to FIG. 1B, the puncture cap, attached to the shaft, is receiving into the wrench in a first position so that a portion of the puncture end 38 can be disposed below the cup floor 44. In this position, the shaft 12 is extended away from the cup a distance 39. The puncture cap base can engage with the interior wall of the lower portion 68 of the cup so that fluid escaping from the filter cannot escape through the cup opening. When force is applied to the impact member 18, the puncture cap is forced into an area defined by the cup as shown in FIG. 1C. In this second position, the puncture cap can puncture the filter creating an opening in the filter allowing the fluid in the filter to escape into the cup. In the second position, the puncture cap can press against the filter preventing oil from escaping from the filter. When the puncture cap is then placed in the first position, fluid can escape the filter, travel through the puncture cap opening through the shaft and out the impact member opening.

Figure 2:
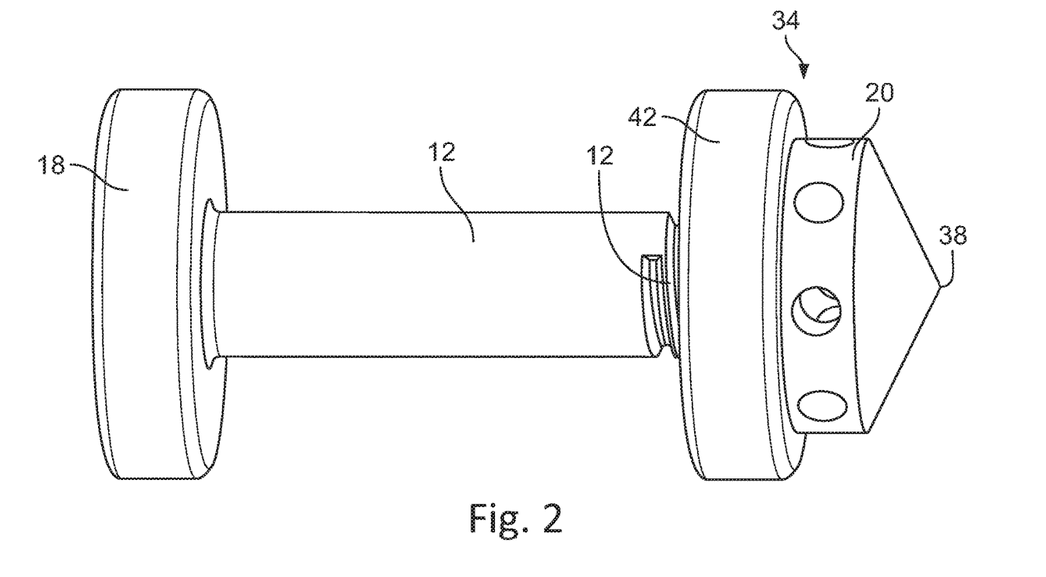
FIG. 2 is a side view of an aspect of the tool.

Referring to FIG. 2, an impact member 18 is attached to a shaft 12 that include a bore running along the length of the shaft. The impact member can have an impact member opening in fluid communications with the bore of the shaft. The impact member opening can be a central opening extending through the impact member. The shaft can include a threaded portion 22 allowing the shaft to be removably connected to a puncture cap 34. The puncture cap can include a puncture case base 42 having a base diameter. The puncture cap can include a plurality of openings that allow fluid to flow through the openings, into the puncture cap and into the bore of the shaft. The puncture cap in one embodiment, can include a washer, O-ring, or other seal disposed on the top of the puncture cap base or around its perimeter to eliminate or reduce the amount of fluid that escapes between the puncture cap and the wrench. A puncture end 38 can be included in the puncture cap that, when forced into the housing of a filter, causes fluid to escape from the filter, through the central level opening, through the bore, and out the impact member. The largest diameter of the puncture end can be about the same diameter as that of the central level.

Figure 3:
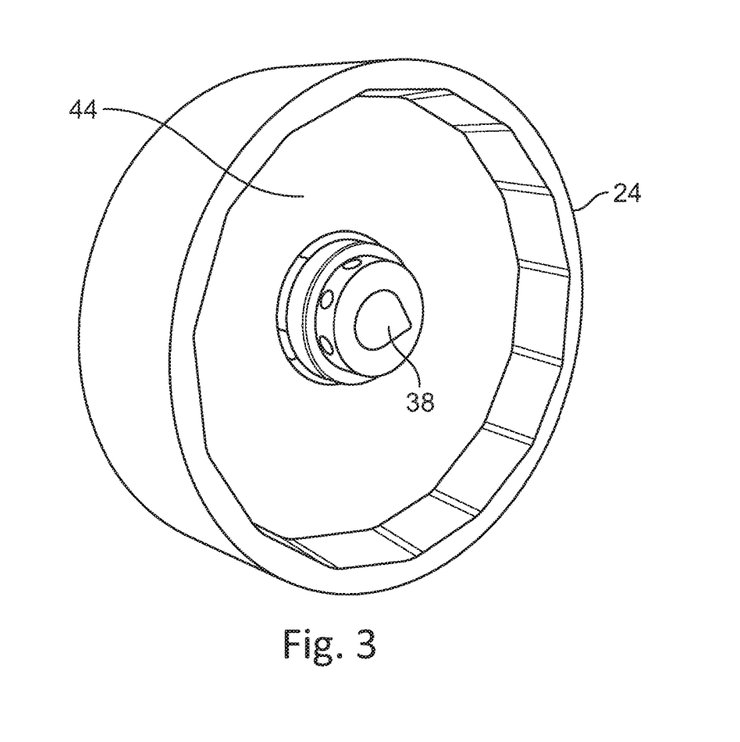
FIG. 3 is a perspective view of aspects of the tool.

Referring to FIG. 3, the puncture end 38 is shown extending into a wrench 24. The tip of the puncture end can be flush with the cup floor 44 of the cup when the filter is received into the cup. The flat sides of a filter can engage with the filter allowing the filter to be rotated when the wrench is rotated. When the filter is received in the cup, force can be applied to the impact member causing the impact member to penetrate the filter creating an opening allowing fluid to escape form the filter, into the bore of the shaft, and out the opening in the impact member.

Figure 4A:
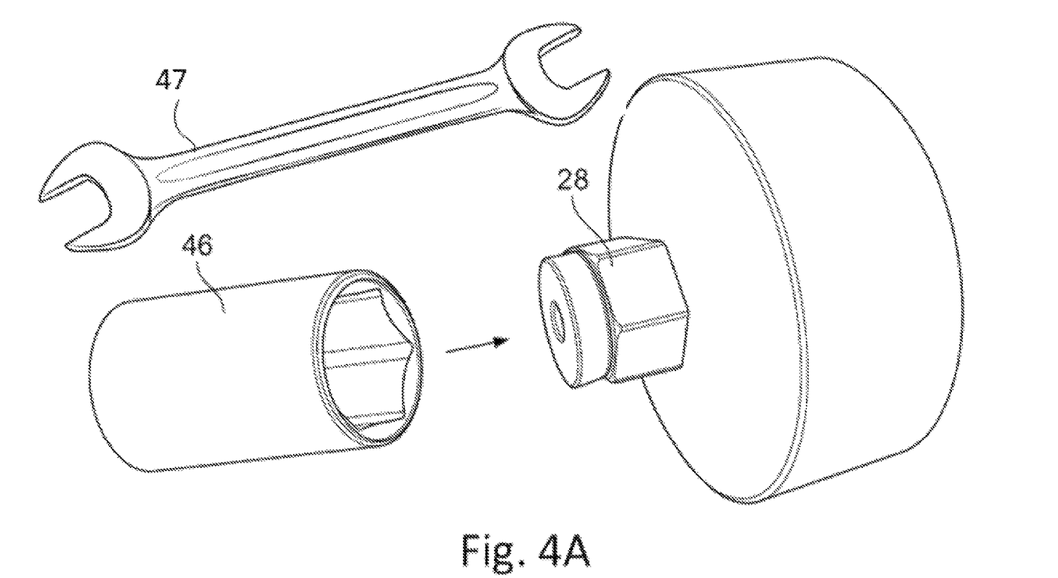
FIG. 4A is a perspective view of aspects of the tool.
Figure 4B:
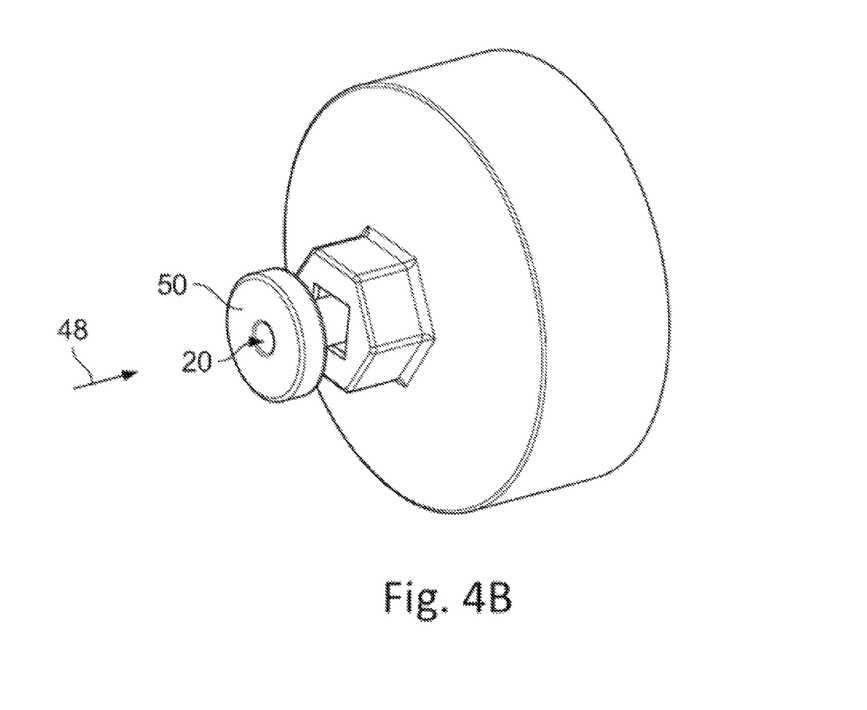
FIG. 4B is a perspective view of aspects of the tool.

Referring to FIG. 4A, the impact member is shown adjacent to the wrench in the second position. The impact member can have a diameter that is less than that of a tool removal portion 28 allowing a rotational tool such as a socket 46, open wrench 47, closed wrench or another tool to be used to rotate the wrench. The impact member can be received in the socket allowing a socket wrench to be used to remove the filter. An open wrench or closed wrench or another tool can be used to rotate the wrench to remove the filter. Referring to FIG. 4B, the impact member is shown in the first position with the shaft visibly extending from the bottom of the wrench. Force is applied generally in direction 48 to area 50 causing the puncture end to puncture the filter allowing fluid to escape the filter and escape through the impact member opening 20. The wrench can then be placed in the first position to facilitate fluid being removed from the filter. Once the fluid is removed, the wrench can be placed in the second position for removal of the filter.

Figure 5:
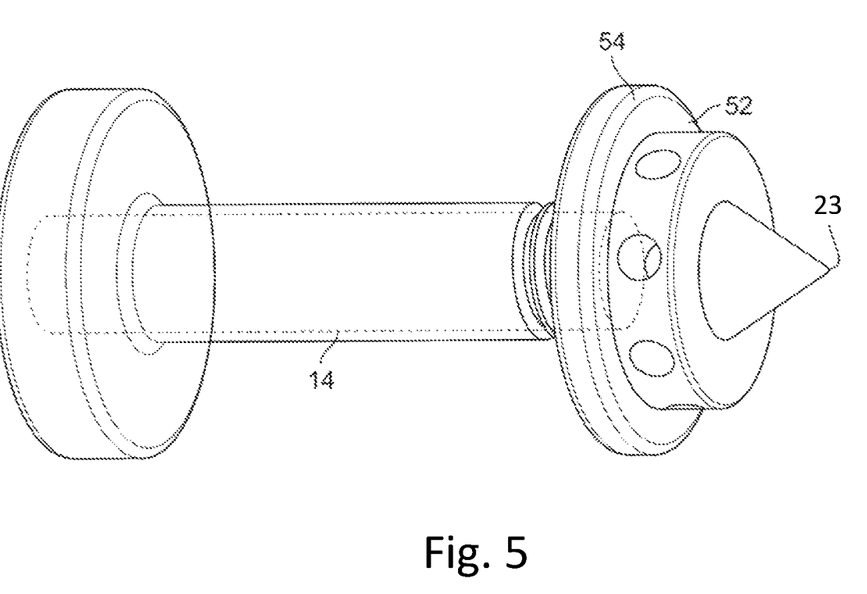
FIG. 5 is a side view of an aspect of the tool.
Figure 6:
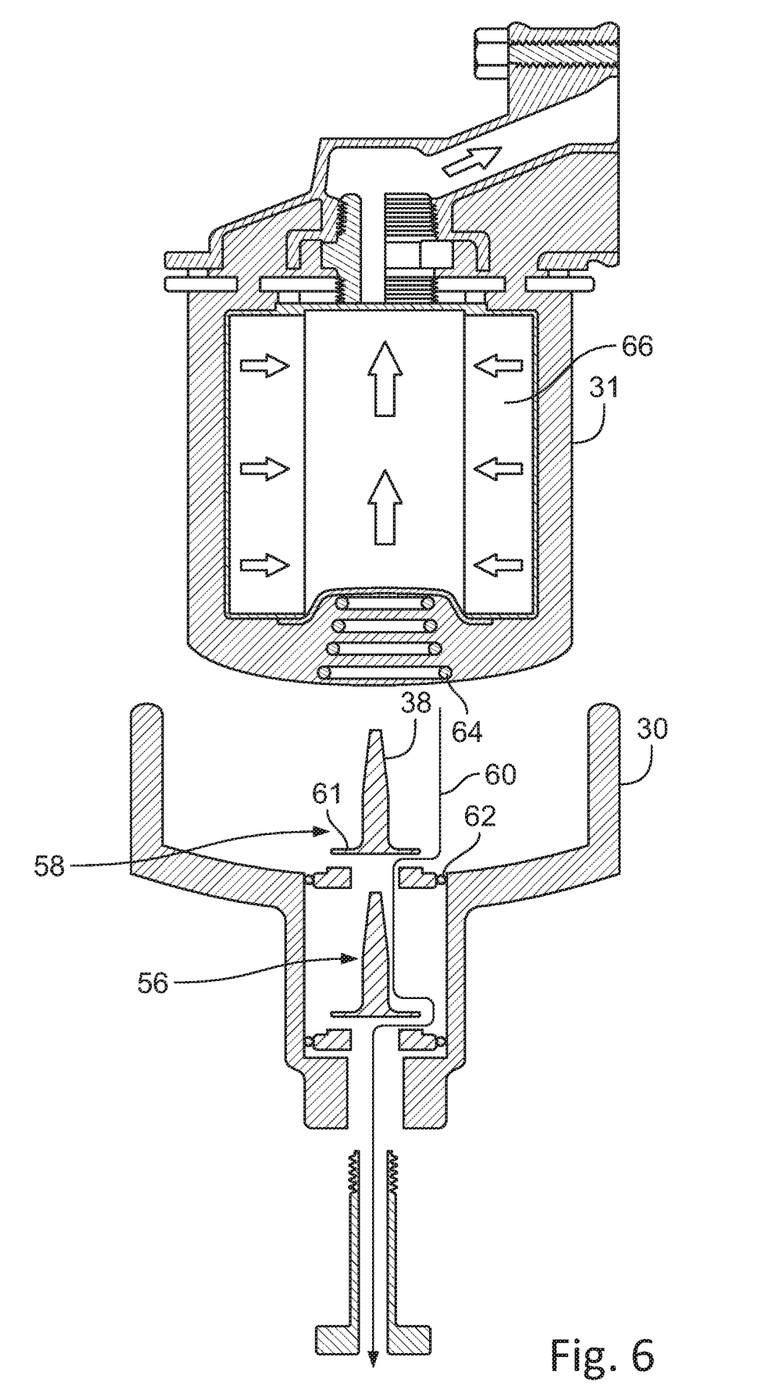
FIG. 6 is a cross section of various aspects of the tool.

Referring to FIG. 5, the puncture cap is shown having a conical puncture end 23 that is disposed on a puncture cap stop 52. The puncture cap stop prevents the entire puncture cap from extending into the filter as the puncture cap stop contacts the wall of the filter arresting the puncture cap's movement into the filter. When the puncture cap is removed form the shaft, the wrench can be disposed between the impact member and the puncture cap and the shaft allowing the wrench to move along the shaft. An O-ring or other seal can be disposed around the side 54 of the base or the puncture cap. The bore can be Referring to FIG. 6, a cross section of the removal tool is shown in one embodiment. The cup 30 is placed on the filter 31 so the flutes of the wrench can engage with flat portions of the filter. The puncture cap is received in the cup in the first position 56 so that the puncture end 38 does not puncture the filter. Once the filter is received in the cup, force is applied to the impact member forcing the puncture cap into the second position 58 allowing the puncture end to puncture the filter. Fluid from the filter can then travel along fluid path 60 and out the impale member. A puncture cap seal 61 can be included that can engaged with the filter when the wrench is in the second position to prevent fluid from escaping the filter. When the wrench is placed on the first position, fluid can then escape the filter into the cup. An O-ring 62 or other seal can be disposed between the cup and the puncture cap. In one configuration the puncture end can puncture the filter between a biasing member 64 of the filter 31 and the filter material 66 itself is not punctured.

Figure 7A:
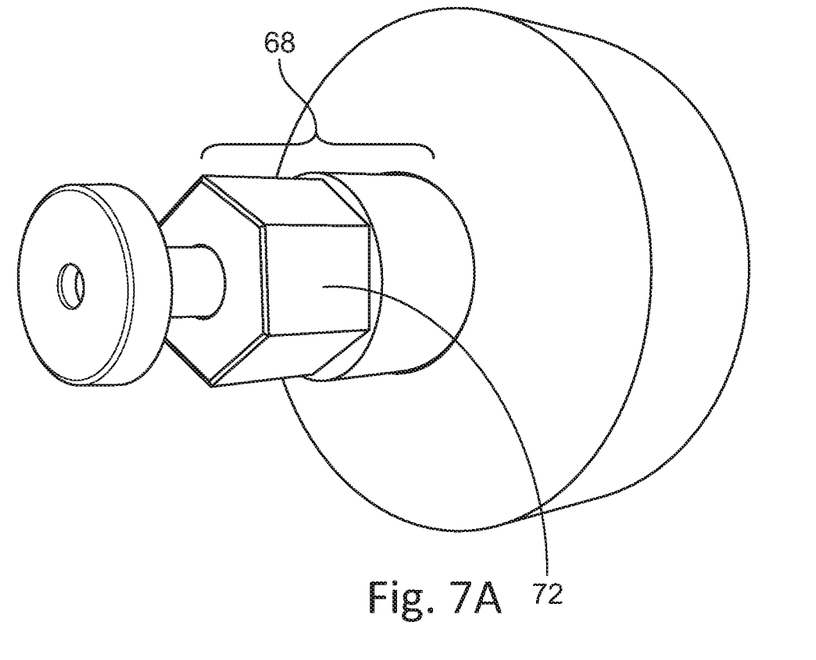
FIGS. 7A and 7B are perspective view of an aspect of the tool.
Figure 7B:
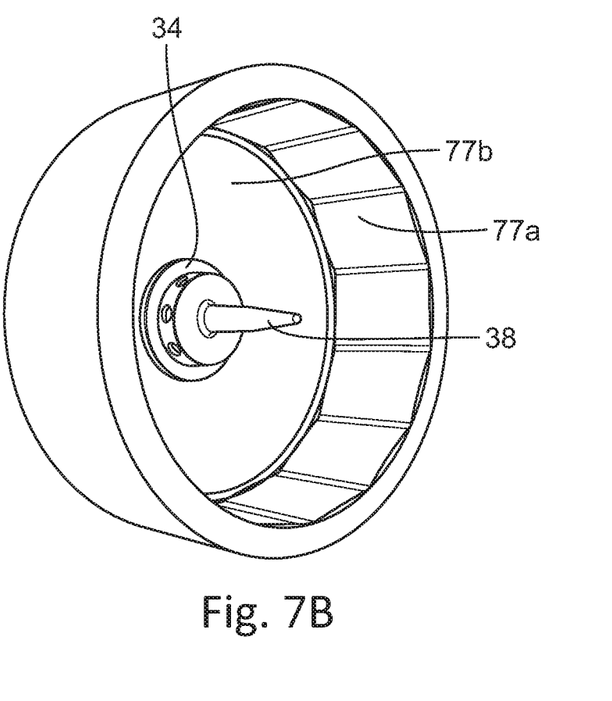

Referring to FIGS. 7A and 7B, the proximal end of the wrench can include a lower portion 68 that can include a flat sided portion 72 that can be configured to engage a rotational tool. The lower portion can include a recess defined to receive the puncture cap 34 and the puncture end 38. Magnets can be disposed on side walls 77a or floor 77b of the cup to retain the cup on the filter. This can assist with holding the cup on the filter when applying force on the impact element.

Figure 8A:
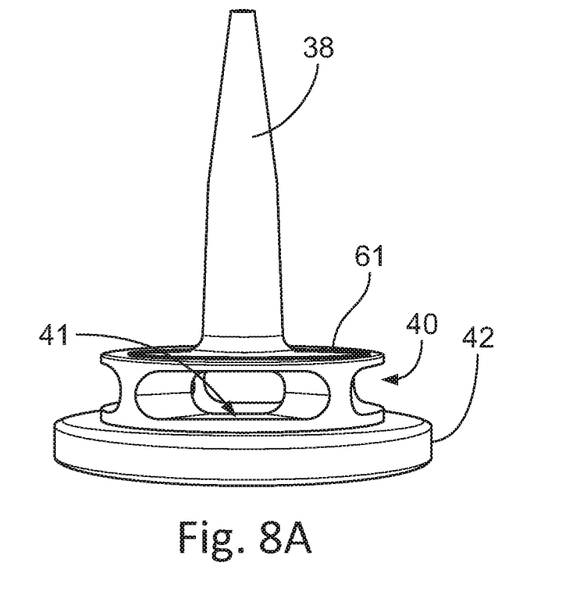
FIG. 8A is an elevated view of an aspect of the tool.
Figure 8B:
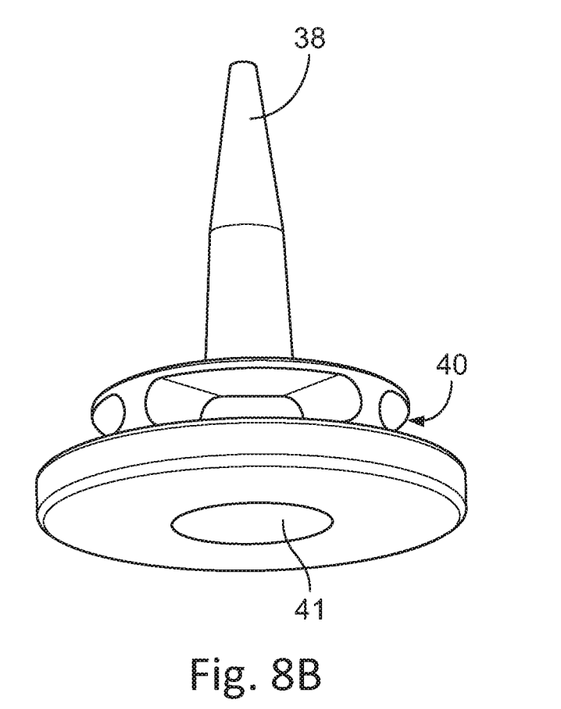
FIG. 8B is an elevated view of an aspect of the tool.

Referring to FIGS. 8A and 8B, the puncture end 38 is shown. The puncture cap includes lateral puncture cap opening 40 in fluid communications with a lower puncture cap opening 41. The diameter of the puncture cap base 42 can be greater than the diameter of the lateral puncture cap opening section so that fluid can flow from the filter to the lower puncture cap opening without traveling around the puncture cap base. The puncture cap seal 61 can be disposed between the lateral puncture cap opening portion and the filter.

Figure 9:
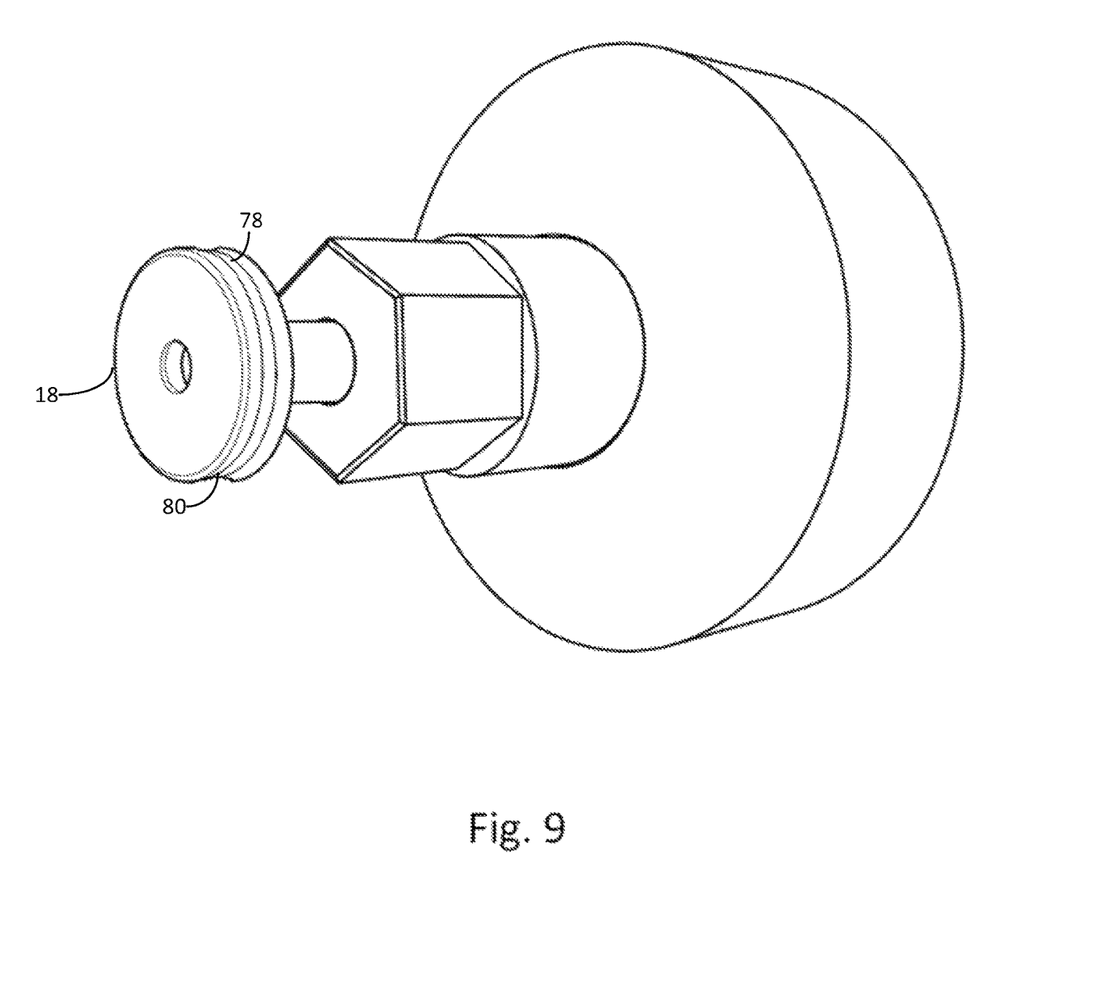
FIG. 9 is a perspective view of aspects of the tool.

Referring to FIG. 9, the impact member 18 can include a recess portion 78 that can fully or partially surround the impact member. The recess position can provide for one or more edges 80 to assist with gripping the impact member to move the shaft between its positions. The impact member can also include extension that extend circumferentially or laterally from the impact member to assist with gripping the impact member. The impact member can also include a textured surface to assist with gripping the impact member.

It is understood that the above descriptions and illustrations are intended to be illustrative and not restrictive. It is to be understood that changes and variations may be made without departing from the spirit or scope of the following claims. Other embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventor did not consider such subject matter to be part of the disclosed inventive subject matter.

What is claimed is:

1. A removal tool comprising:
   a cup configured to engage with a filter so that rotating the cup rotates the filter;
   a shaft having a bore and extending through the cup at a proximal end of the cup;
   a puncture cap removably attached to the shaft and configured to be received in the cup and to puncture the filter when the shaft transitions from a first position to a second position;
   a lateral puncture cap opening defined in the puncture cap in fluid communication with the bore; and,
   a removal tool portion carried by the cup configured to receive a rotational tool for rotating the cup.

2. The tool of claim 1 including an impact member attached to a proximal end of the shaft having an impact member opening defined in the impact member in fluid communication with the puncture cap.

3. The tool of claim 1 including a lower portion included in the cup for receiving the puncture cap when the shaft is in the first position.

4. The tool of claim 1 including a seal disposed between a base of the puncture cap and an interior wall of a lower portion of the cup.

5. The tool of claim 1 including a puncture cap seal disposed above a base of the puncture cap and configured to engage with the filter when the shaft is in the second position.

6. The tool of claim 1 including magnets disposed in the cup for removably securing the cup to the filter.

7. The tool of claim 1 including a stop in the puncture cap to arrest the puncture cap from fully penetrating the filter.

8. A removal tool comprising:
   a cup configured to engage with a filter so that rotating the cup rotates the filter;
   a puncture cap carried by a shaft and configured to be received in the cup and to puncture the filter when the shaft transitions from a first position to a second position; and,
   a lateral puncture cap opening defined in the puncture cap configured to allow fluid to flow from the cup to a proximal end of the cup.

9. The tool of claim 8 including a removal tool portion defined in a lower portion of the cup configured to receive a rotational tool for rotating the cup.

10. The tool of claim 8 wherein the shaft is removably connected to the puncture cap.

11. The tool of claim 8 including an impact member carried by the shaft.

12. The tool of claim 8 including a second cup opening configured to receive the puncture cap in a first position.

13. The tool of claim 12 including a puncture cap base included in the puncture cap configured to engage with an inner wall of the second cup opening.

14. A removal tool comprising:
   a cup configured to receive a portion of a filter;
   a puncture cap carried by the cup and configured to puncture the filter to allow a fluid to flow from the filter, through the puncture cap and out the cup; and,
   an opening defined in the puncture cap configured to allow the fluid to flow from the filter out the cup.

15. The tool of claim 14 including a shaft carried by the puncture cap having a bore in fluid communications with an interior of the cup.

16. The tool of claim 14 including a removal tool portion carried by the cup to receive a rotational tool.

17. The tool of claim 14 including a first position where the puncture cap is received in a lower portion included in the cup.

18. The tool of claim 17 wherein the cup is configured to prevent the fluid from flowing from the filter when the puncture cap is in a second position.

19. The tool of claim 14 including a removal tool portion included in the cup wherein the cup is configured to rotate the filter when the cup is rotated.

20. The tool is claim 14 wherein the puncture cap is removably attached to the cup.

\* \* \* \* \*